United States Patent
Ayat et al.

(10) Patent No.: US 12,231,020 B2
(45) Date of Patent: Feb. 18, 2025

(54) PROTECTION FOR THE COILS OF AN ELECTRIC MACHINE

(71) Applicants: SAFRAN, Paris (FR); UNIVERSITE DE LORRAINE, Nancy (FR)

(72) Inventors: Sabrina Siham Ayat, Moissy-Cramayel (FR); Rémi Luc Stéphane Dorget, Moissy-Cramayel (FR); Benjamin Daguse, Moissy-Cramayel (FR)

(73) Assignees: SAFRAN, Paris (FR); UNIVERSITE DE LORRAINE, Nancy (FR)

( * ) Notice: Subject to any disclaimer, the term of this patent is extended or adjusted under 35 U.S.C. 154(b) by 32 days.

(21) Appl. No.: 18/273,488

(22) PCT Filed: Jan. 13, 2022

(86) PCT No.: PCT/FR2022/050072
§ 371 (c)(1),
(2) Date: Jul. 20, 2023

(87) PCT Pub. No.: WO2022/157441
PCT Pub. Date: Jul. 28, 2022

(65) Prior Publication Data
US 2024/0097549 A1 Mar. 21, 2024

(30) Foreign Application Priority Data
Jan. 21, 2021 (FR) .................................. FR2100428

(51) Int. Cl.
*H02K 55/02* (2006.01)
*B64D 27/24* (2006.01)

(52) U.S. Cl.
CPC ............ *H02K 55/02* (2013.01); *B64D 27/24* (2013.01)

(58) Field of Classification Search
CPC ............... H02K 55/00–55/06; H02K 2211/00
See application file for complete search history.

(56) References Cited

U.S. PATENT DOCUMENTS

2020/0052557 A1* 2/2020 Rubin ..................... H02P 23/14

FOREIGN PATENT DOCUMENTS

| FR | 3 093 599 A1 | 9/2020 |
| JP | 2011-61994 A | 3/2011 |
| RU | 2 129 329 C1 | 4/1999 |

OTHER PUBLICATIONS

French Search Report for French Application No. FR2100428, dated Oct. 1, 2021.

(Continued)

*Primary Examiner* — Ramon M Barrera
(74) *Attorney, Agent, or Firm* — BIRCH, STEWART, KOLASCH & BIRCH, LLP

(57) ABSTRACT

The present invention relates to a superconducting electric machine (1) comprising an inductor (3) having: —superconducting pellets (7) circumferentially distributed about an axis (X) of the electric machine (1), —an armature (2) comprising coils (5), each coil (5) having a circumferential radially inner edge (10) and a circumferential radially outer edge (9), and—at least one flow barrier (12, 12') extending circumferentially with respect to the axis (X), each flow barrier (12) extending between the superconducting pellets (7) and the armature (2) so as to at least partially cover at least one of the radially outer edge (9) and the radially inner edge (10) of all or part of the coils (5) of the armature (2).

15 Claims, 10 Drawing Sheets

(56) References Cited

OTHER PUBLICATIONS

International Search Report for International Application No. PCT/FR2022/050072, dated Apr. 7, 2022.
Miki et al., "Development of a synchronous motor with Gd—Ba—Cu—O bulk superconductors as pole-field magnets for propulsion system," Superconductor Science and Technology, vol. 19, 2006, pp. S494-S499.

* cited by examiner

PROTECTION FOR THE COILS OF AN ELECTRIC MACHINE

FIELD OF THE INVENTION

This invention relates to the field of electric machines comprising superconducting pellets that can in particular be used in aircraft. In particular, the invention is applicable to electric machines comprising magnetic or non-magnetic pellets, to electric machines with superconducting magnets or with superconducting flux barriers, entirely superconducting machines (superconducting armature and inductor) or partially superconducting (superconducting armature or inductor) as well as to radial or axial flux superconducting machines.

BACKGROUND

A field of engineering is concerned with future means of transport, seeking to make systems more environmentally friendly. In the field of air transport, various projects and prototypes are already in existence, such as SOLAR IMPULSE or the Airbus E-FAN. Environmental concerns and the reduction in fuel consumption and noise are all criteria that encourage the use of electric machines. To be able to replace the current technologies, aeronautical manufacturers are working increasing the power density of these electric machines. A study is thus being carried out on the gain that HCT superconducting materials would provide for on-board actuators.

A superconducting material is a material which, when cooled at a temperature below its critical temperature, has zero resistivity, thus offering the possibility for DC currents to flow without losses. This results in several phenomena, such as the diamagnetic response for any variation in the magnetic field, which can be used to make excellent magnetic shields.

In a manner known per se, an electric machine comprises an inductor and an armature. The inductor comprises an HCT coil made with HCT wires which generates a magnetic field modulated by superconducting pellets, which serve as magnetic screens. The armature, meanwhile, comprises a three-phase copper winding system comprising an arrangement of coils which rest on a ferromagnetic or non-magnetic support. The rotation of the screens causes the magnetic field to vary and induces an electromotive force in the coils by Lenz' law. The dimensioning of such a machine leads to an axial flux structure with no rotary supply system (slip ring/brush type). The maintenance and the safety problems caused by a rotary slip ring/brush system are therefore avoided.

This electric machine is partially superconducting insofar as only the inductor is made of a superconducting material, as opposed to a totally superconducting machine, all the active parts of which are designed with superconducting materials.

In the remainder of the text, the term "inductor" will refer to the HCT coil and the superconducting pellets configured to modulate the magnetic flux created by the HCT coil. Note that, in a superconducting electric machine with flux barriers, use is made of the diamagnetic behavior of the superconducting pellets when they are cooled outside the field. The superconducting pellets are in this case non-magnetic and form a screen (screening) which deflects the field lines, when they are placed under a magnetic field. The magnetic field is then concentrated and of high amplitude between the non-magnetic superconducting pellets and of low amplitude downstream of these pellets. In a variant, the superconducting pellets can be magnetic and form superconducting magnets. This is referred to as a superconducting magnet machine.

Generally, the pellets are made of at least one of the following materials which in particular possess very good screening features: made of YBCO (Yttrium Barium Copper Oxide), GdBCO (Gadolinium-Barium-Copper-Oxygen), NbTi (niobium-titanium), in MgB2 (magnesium diboride) or any RE-Ba—Cu—O material where RE can be any rare earth.

The pellets are generally obtained using the method of growing from seeds. The reader is referred to the article by M. Morita, H. Teshima, and H. Hirano, "Development of oxide superconductors", Nippon Steel Technical Report, vol. 93, p. 18-23, 2006 for more details on this method. In particular, this type of method consists in forming a crystal by gradual solidification of material on the surface of a pre-existing seed. The pellets thus obtained are therefore generally of circular or rectangular shape. In a variant, provision has also been made for making the pellets by sintering. However, the inter-grain connection associated with this manufacturing method tends to reduce the performance of the pellets. Another method consists in using superconducting tapes for the manufacturing of superconducting pellets. This is referred to as a stack of tapes. These pellets, the superconducting core of which is reinforced by the matrix of the tapes forming them, have good mechanical strength. This good mechanical strength is particularly advantageous when the pellets are magnetic (superconducting magnet machine).

However, the Applicant has observed that, in an electric machine comprising superconducting pellets, the forces generated at the outer periphery of the coils of the armature, which can reach 100 N for example, tend to deform the coils which creates mechanical problems of structure and is liable to reduce the efficiency of the electric machine.

SUMMARY

An aim of the invention is to make provision for a superconducting machine wherein the risks of deformation of the coils of the armature are reduced, without however reducing the efficiency of the electric machine.

Another aim of the invention is to increase, simply and effectively, the power density of superconducting machines.

The invention applies to any type of superconducting machine, which particularly comprise partially superconducting or totally superconducting machines, machines with flux barriers or with superconducting magnets, with axial or radial flux.

For this purpose provision is made, according to a first aspect of the invention, for a superconducting electric machine comprising an inductor comprising superconducting pellets circumferentially distributed around an axis of the electric machine and an armature comprising coils, each coil having a radially inner edge and a radially outer edge, the radially inner edge and the radially outer edge extending along a circumferential direction with respect to the axis. Moreover, the electric machine further comprises at least one flux barrier extending circumferentially with respect to the axis, each flux barrier extending between the superconducting pellets and the armature such as to at least partially cover at least one from among the radially outer edge and the radially inner edge of all or part of the coils of the armature.

Certain preferred but non-limiting features of the electric machine according to the first aspect are as follows, taken individually or in combination:

the flux barrier at least partially covers at least one from among the radially outer edge and the radially inner edge of all the coils of the armature;

the flux barrier covers the entire radially outer edge and/or the entire radially inner edge of all or part of the coils of the armature;

each coil furthermore has lateral edges connecting the radially inner edge and the radially outer edge, the flux barrier covering at the most 10% of the lateral edges;

the flux barrier is discontinuous and comprises at least one slit extending along a substantially radial direction with respect to the axis;

the electric machine further comprises an insulating layer housed in the slit;

the flux barrier at least partially covers the radially inner edge; it is then able to be continuous over its entire circumference in the case of an axial flux electric machine;

the flux barrier has an annular shape;

the flux barrier comprises a series of ring sectors, each ring sector extending between two superconducting pellets;

the flux barrier is attached to the armature or to the inductor;

the flux barrier is secured to the superconducting pellets;

the electric machine further comprises a coil coaxial with the axis extending radially around the superconducting pellets, the flux barrier being attached to a radially inner face of the coil of the inductor;

an outer radius of the flux barrier is greater than or equal to an outer radius of the superconducting pellets; and/or the electric machine comprises a flux barrier at least partially covering the radially outer edge of all or part of the coils of the armature and an additional flux barrier extending circumferentially with respect to the axis, said additional flux barrier extending between the superconducting pellets and the armature such as to at least partially cover the radially inner edge of all or part of the coils of the armature.

According to a second aspect, the invention makes provision for an aircraft comprising an electric machine according to the first aspect.

DESCRIPTION OF THE DRAWINGS

Other features, aims and advantages of the invention will become apparent from the following description, which is purely illustrative and non-limiting, and which must be read with reference to the appended drawings wherein:

FIG. 2b is a simplified, exploded and perspective view of a variant embodiment of FIG. 2a;

In all the figures, similar elements bear identical reference numbers.

DETAILED DESCRIPTION OF THE INVENTION

In the remainder of the text, the invention will be described and illustrated for the case of a partially superconducting axial flux electric machine with flux barriers, with non-magnetic pellets. As has already been stated above, this is however non-limiting, the invention also applying mutatis mutandis to electric machines comprising magnetic pellets, to electric machines with superconducting magnets, to entirely superconducting electric machines (superconducting armature and inductor) as well as to radial flux electric machines.

Figure 1:
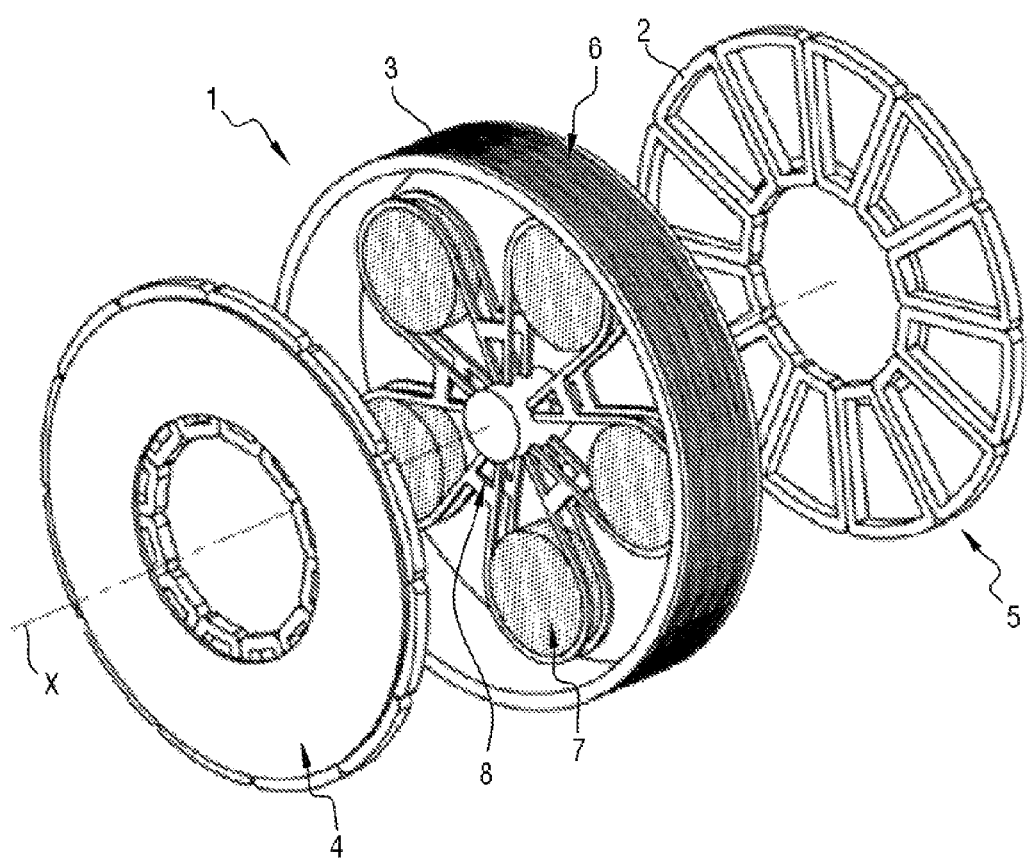
FIG. 1 is an exploded and schematic view of an example of an axial flux electric machine of the prior art.

FIG. 1 schematically represents a superconducting axial flux electric machine 1 with flux barriers according to an embodiment of the invention conventionally comprising a rotating part, or rotor, and a fixed part, or stator.

In this application, the axis of rotation of the rotor is referred to as its axis X. The axial direction of the axis X and a radial direction is a direction perpendicular to this axis and passing through it. Moreover, the circumferential (or lateral) direction corresponds to a direction perpendicular to the axis X and not passing through it. Unless otherwise specified, the terms "inner" (or "inward" respectively) and "outer" (or "outward" respectively), are used with reference to a radial direction such that the inner part or face of an element is closer to the axis X than the outer part or face of the same element.

In a manner known per se, the superconducting axial flux electric machine 1 comprises an armature 2 and an inductor 3. The armature 2 includes an arrangement 4 of non-superconducting electromagnetic coils 5, generally made of copper. The inductor 3 includes a superconducting coil 6 coaxial with the arrangement 4 of the electromagnetic coils 5 of the armature 2 and the superconducting pellets 7 mounted on a bearing structure 8 which are disposed in one and the same plane orthogonal to the axis X and radially inward of the superconducting coil 6. Optionally, the inductor 3 further comprises a stator yoke including an iron ring 8. Here the rotor is formed by superconducting pellets 7 which are rotationally driven about an axis of rotation extending along the axial direction. The stator is formed by the arrangement 4 of electromagnetic coils 5 and the superconducting coil 6.

The superconducting pellets 7 are made of superconducting material and are distributed equidistantly around the axis of rotation, which allows a spatial variation in the electromagnetic field in the air gap. Here, the superconducting pellets 7 are non-magnetic. In a variant, the superconducting pellets 7 could be magnetic. For example, the pellets are made of YBCO (Yttrium Barium Copper Oxide), GdBCO (Gadolinium-Barium-Copper-Oxygen), NbTi (niobium-titanium), MgB2 (magnesium diboride) or any other RE-Ba—Cu—O material where RE can be any rare earth.

The superconducting coil 6 of the inductor 3 is a static superconducting coil supplied with a DC current. Where applicable, when the electric machine 1 comprises a yoke 4, this provides a good mechanical strength of the electromagnetic coils 5 of the armature 2. In other words, the inductor 3 is superconducting while the armature 2 is non-superconducting.

The superconducting pellets 7 can have any suitable form.

In a first embodiment, each superconducting pellet 7 has, in a manner known per se, the form of a solid disc (as illustrated in FIG. 1).

In a second embodiment, the superconducting pellet 7 can be hollow in order to adapt its shape to the thickness of penetration of the magnetic field in the pellet 7. Each superconducting pellet 7 comprises for this purpose a circumferential wall which has:
  a first edge,
  a second edge opposite the first edge
  an inner face connecting the first edge and the second edge
  an outer face opposite the inner face and
  a cavity formed between the first edge, the second edge and delimited by the inner face of the circumferential wall.

The inner face extends radially inward of the outer face. The superconducting pellet 7 is therefore hollow in that it has a cavity which, as will be seen below, can be open, through or enclosed in the superconducting pellet 7. The cavity is preferably empty (devoid of material).

Optionally, the superconducting pellet 7 may comprise one or more additional walls dividing the cavity into several parts. Where applicable, a through orifice can be formed out of all or part of the walls. The reader is referred to the document FR2020/052301 in the name of the Applicant for more details on these different forms of production of superconducting pellets 7 with a cavity.

Figure 2A:
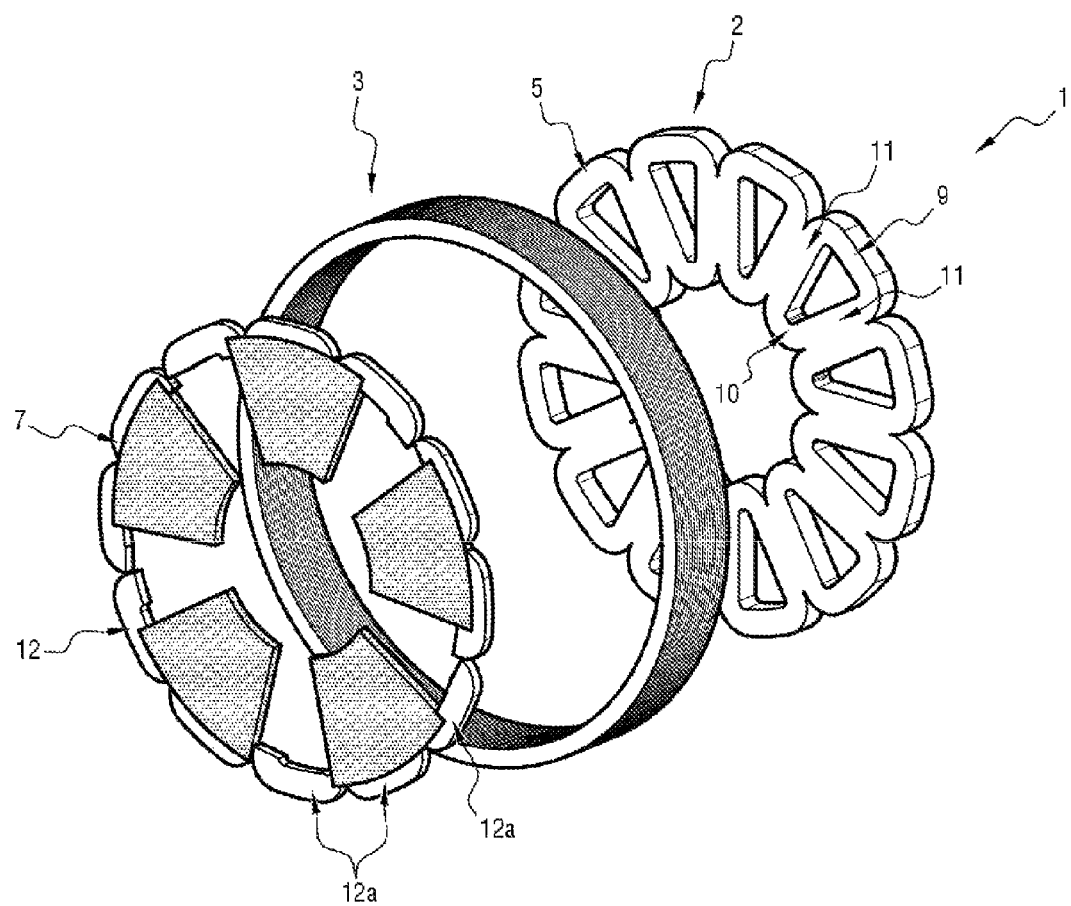
FIG. 2a is a simplified, exploded and perspective view of an axial flux electric machine in accordance with a first embodiment of the invention, wherein the flux barrier is attached to the superconducting pellets.
Figure 2B:
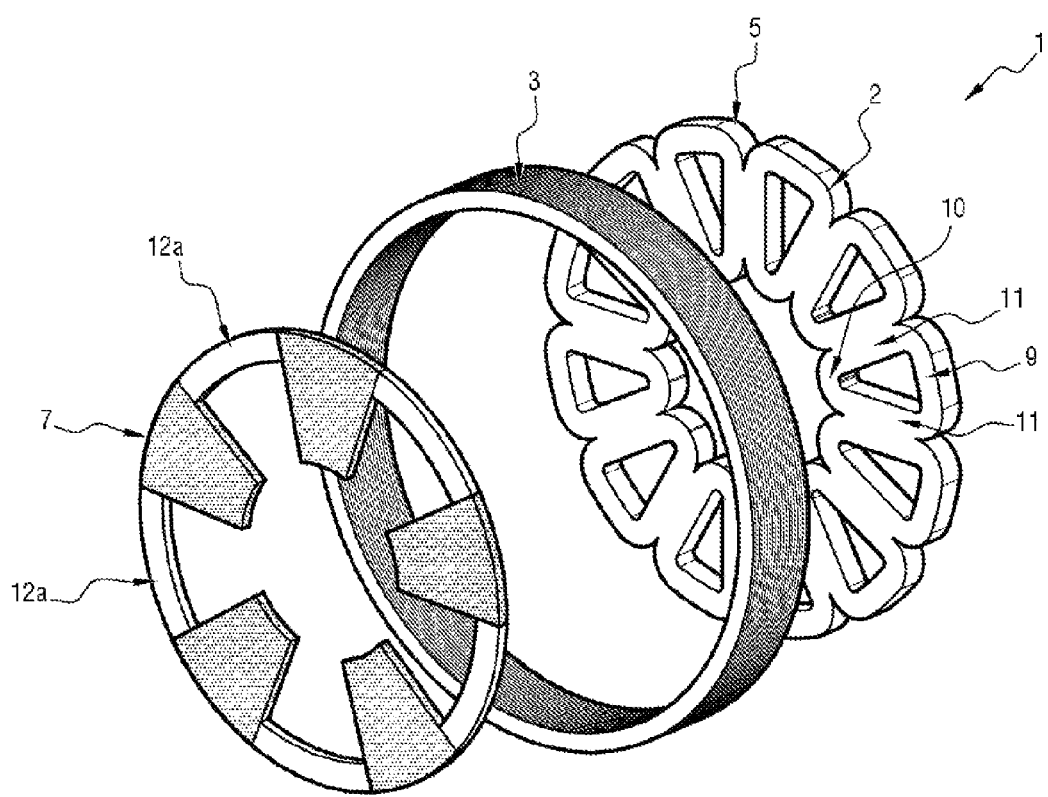
Figure 4A:
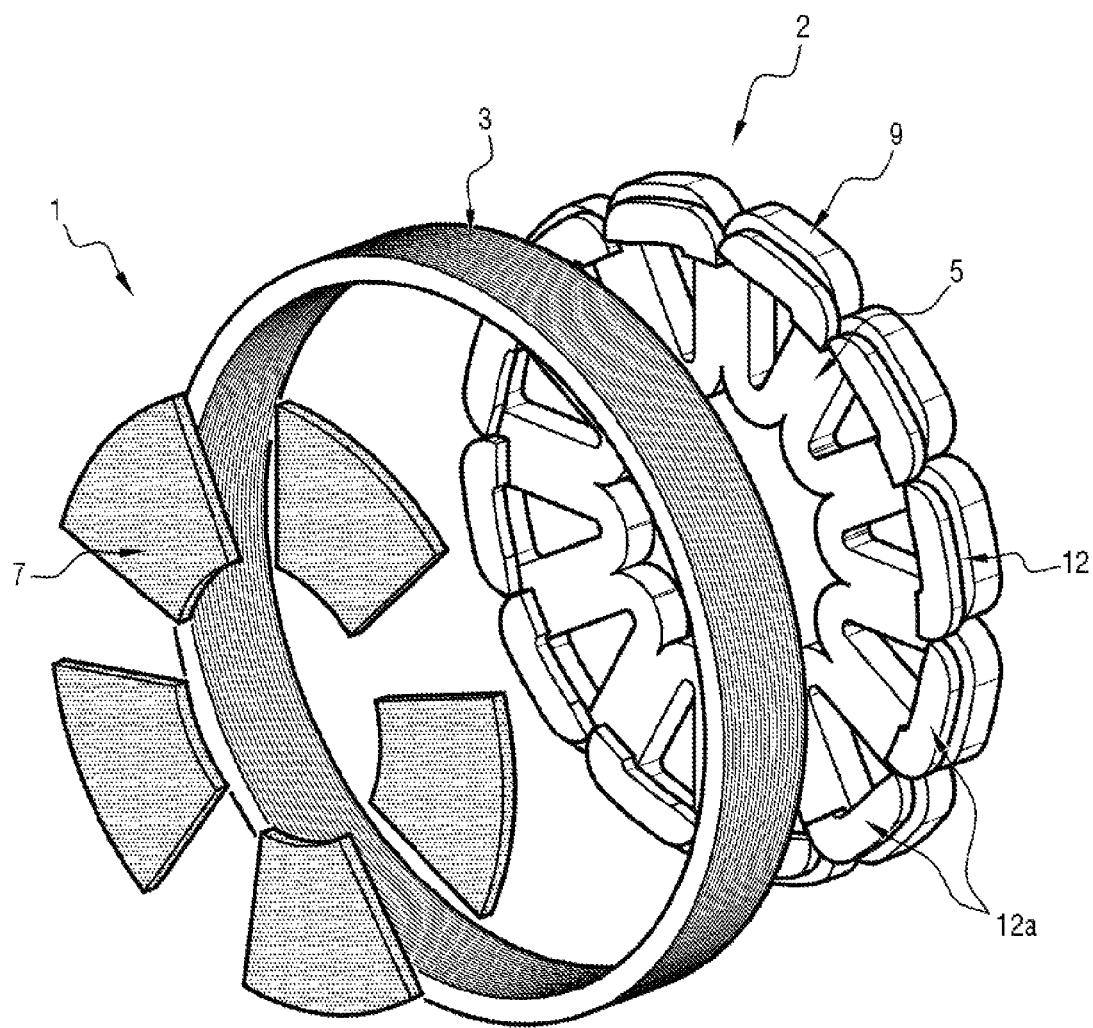
FIG. 4a is a simplified, exploded and perspective view of an axial flux electric machine in accordance with a second embodiment of the invention, wherein the flux barrier is attached to the inductor coils.
Figure 5A:
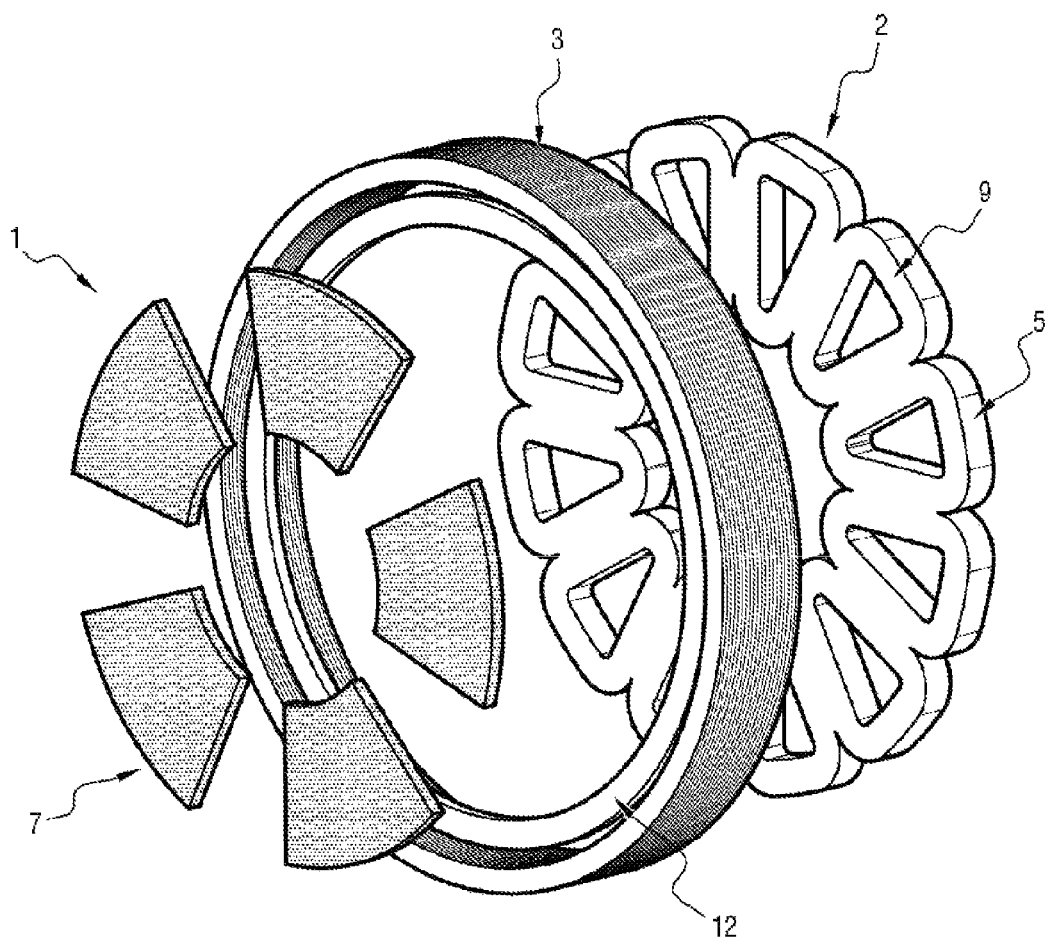
FIG. 5a is a simplified, exploded and perspective view of an axial flux electric machine in accordance with a fourth embodiment of the invention, wherein the flux barrier is mounted radially inward of the inductor coil.

In a third embodiment illustrated in FIGS. 2, 4a and 5a, the shape of the superconducting pellets 7 is adapted (optimized) such as to maximize the screening/weight ratio of the pellets 7, i.e. the shape of the superconducting pellets 7 is adapted so that the variation in the axial component of the induced magnetic field, and therefore the screening of the magnetic flux, is maximal, while minimizing the weight of the superconducting pellets 7. One can thus obtain an increase in the speed of rotation of the rotor and therefore of the power of the electric machine 1. For this purpose the superconducting pellets 7 can have a polygonal shape having at least five sides. For example the pellet 7 has a hexagonal shape, preferably that of an isometric regular hexagon. In a variant, the face 8 of each superconducting pellet 7 has the geometry and the dimensions of a ring sector. The term "ring sector" will here be understood to mean the shape delimited on the one hand by two coaxial circles, of different diameter, and on the other hand by two straight line segments coming from the center of the circles. The ring sector thus comprises two curved opposite sides and two straight opposite sides.

The reader is referred to the document FR2020/052301 in the name of the Applicant for more details about these different forms of embodiment of superconducting pellets 7.

The coils 5 of the armature 2 can also have any suitable shape. In a manner known per se, the coils 5 can in particular have a ring sector shape, as illustrated in FIGS. 2, 4a, and 5a.

Whatever the shape of the coils 5 of the armature 2, each coil has a radially inner edge 10, a radially outer edge 9 and lateral edges 11 which connect the radially inner edge 10 and the radially outer edge 9. The radially inner edge 10 and the radially outer edge 9 extend along a circumferential direction with respect to the axis X while the lateral edges 11 are substantially radial.

To reduce the risks of deformation of the coils 5 of the armature 2 while improving the power density of the electric machine 1, the electric machine 1 further comprises a flux barrier 12 extending circumferentially with respect to the axis X, between the superconducting pellets 7 and the armature 2 such as to at least partially cover the radially outer edge 9 of all or part of the coils 5 of the armature 2. In other words, the flux barrier 12 is positioned such as to mask the radially outer edge 9 of the coils 5. Specifically, the forces at the radially outer edge 9 (or head) of the coils 5 (which can for example reach 100 N) do not produce any torque. However, as seen above, these forces tend to deform the coils 5. Owing to the flux barrier 12, the magnetic field is then screened at the radially outer edge 9 of the coils 5 and redirected from the armature 2 toward the active regions of the electric machine 1, i.e. radially in the direction of the lateral edges 11 and of the radially inner edge 10 of the coils 5, which makes it possible to increase the power density of the electric machine 1.

Preferably, the flux barrier 12 is placed in front of the armature 2 such as to at least partially cover the radially outer edge 9 of all the coils 5 of the armature 2. In this way, the magnetic field is screened at the radially outer edge of the coils 5 over the circumference of the armature 2. The armature 2 is thus protected from any deformations and the power density of the electric machine 1 is maximized.

The flux barrier 12 is preferably made of a superconducting material. In particular, the flux barrier 12 can be made of any of the superconducting materials envisioned for the superconducting pellets 7 listed above. Where applicable, the flux barrier 12 can be made of the same superconducting material as the pellets 7.

In a form of embodiment, the flux barrier 12 is placed in front of the armature 2 such as to cover the entire radially outer edge 9 of the coils 5. However, to avoid degrading the power density of the electric machine 1, at the most 10% of the surface of the lateral edges 11 of the coils 5 of the armature 2 are covered by the flux barrier 12.

The flux barrier 12 can be attached to the armature 2 or to the inductor 3.

Preferably, the flux barrier 12 is attached to a rotating part (rotor) of the electric machine 1, for example to the superconducting pellets 7 and/or to the bearing structure 8 on which the superconducting pellets 7 are mounted. This configuration specifically makes it possible to use a flux barrier 12 having a greater thickness (in the order of ten to twenty millimeters in thickness) and therefore to further improve the screening of the magnetic field. Specifically, when the flux barrier 12 is attached at the rotor, it can form a single unit with the superconducting pellets 7 used for the modulation of the flux. These pellets 7 are typically thicker than the flux barrier 12 used for protection (a good quality of screening being required for the modulation of the field). However, when the flux barrier 12 and the pellets 7 are single unit, for the sake of simplicity of production, they can have the same thickness. One consequence of this is the improvement of the screening for the protective flux barrier 12.

In a variant, the flux barrier 12 can be mounted on the stator, for example on the coil 6 of the inductor 3 or on the coils 5 of the armature 2. In this case, the thickness of the flux barrier 12 can be less than one millimeter to avoid impeding the operation of the electric machine 1. Specifically, when the flux barrier 12 is mounted on the coils 5 of the armature 2, it is then located at the air gap of the electric machine 1. However, this air gap must also be as small as possible since it is directly proportional to the torque of the electric machine (and therefore to its power). That is why in this configuration, it is preferable to limit the thickness of the flux barrier 12.

An outer radius of the flux barrier 12 is greater than or equal to an outer radius of the superconducting pellets 7 in order to ensure an effective screening of the magnetic field at the radially outer faces of the coils 5 of the armature 2. The term "outer radius of the flux barrier 12" should here be understood to mean the maximum radius of the flux barrier 12, measured from the axis X of rotation. The term "outer radius of the superconducting pellets 7" should here be understood to mean the maximum radius of said pellets 7, measured from the axis X of rotation.

Thus, when the flux barrier 12 is attached to the superconducting pellets 7 or to their bearing structure 8, said flux barrier 12 extends at least partially radially outward of the superconducting pellets 7.

The flux barrier 12 can extend substantially continuously around the axis X of rotation. However, the flux barrier 12 comprises at least one discontinuity 13 to avoid the flux barrier 12 from e the magnetic field inside the superconducting pellets 7. Specifically, in the absence of any discontinuity 13, current loops would be liable to form on the periphery of the superconducting pellets 7, thus screening the magnetic field inside the pellets 7, which would have an adverse effect on the operation of the electric machine 1.

Figure 3:
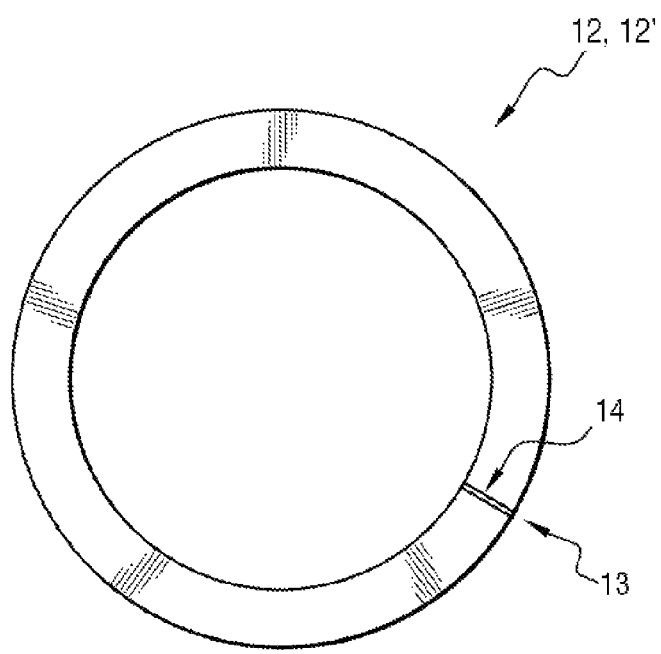
FIG. 3 is a front view of an exemplary embodiment of an annular flux barrier.

The discontinuity 13 can be obtained by the very shape of the flux barrier 12, which may comprise a plurality of sections separated from one another, or by making a slit 13 in the flux barrier 12 (as illustrated in FIG. 3), said slit 13 thus making it possible to break the current loops. Optionally, to guarantee the discontinuity from the flux barrier 12, an insulating layer 14 can be placed in the slit 13 formed in the flux barrier 12. The thickness of the slit 13 can then be substantially equal to the thickness of the insulating layer 14. The insulating layer 14 can for example comprise a polyimide film such as Kapton having a thickness of 0.025 mm.

The flux barrier 12 can have a height substantially equal to the height of the radially outer edge 9 of the coils 5. The term height should here be understood to mean the dimension along a direction radial to the axis X of rotation.

Figure 5B:
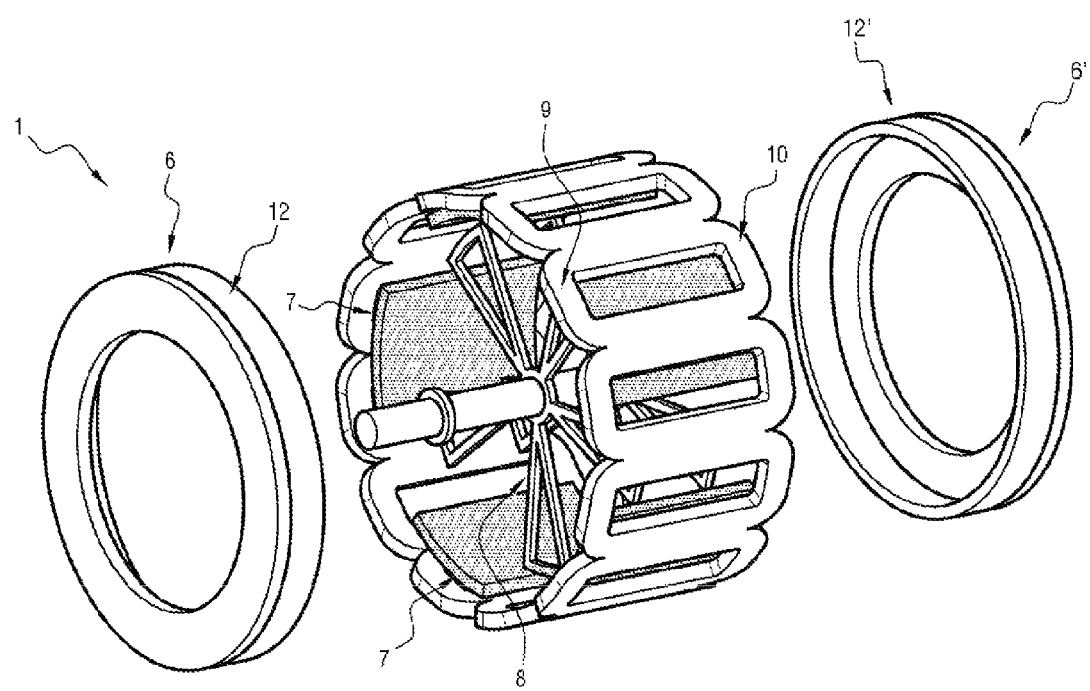
FIG. 5b is a simplified, exploded and perspective view of a radial flux electric machine in accordance with a fifth embodiment of the invention, wherein the flux barrier is mounted radially inward of the inductor coils.

In a first form of embodiment, the flux barrier 12 is annular overall. More precisely, as illustrated in FIGS. 3, 5a and 5b, the flux barrier 12 can take the form of a disc in which a through orifice is made such as to obtain an annular strip. As indicated above, the annular strip 12 can be substantially continuous. Where applicable the annular strip 12 comprises a slit 13 configured to break the current loops and, optionally, an insulating layer 14 placed in the slit 13 (as illustrated in FIG. 3).

In a second form of embodiment (FIG. 2a), when it is attached to the rotor, the flux barrier 12 may comprise a series of sections 12a, for example ring sectors 12a, extending circumferentially around the axis X of rotation and uniformly distributed around the circumference.

Each ring sector 12a of the flux barrier 12 extends between two adjacent superconducting pellets 7.

Each ring sector 12a can be secured to at least one superconducting pellet 7. For example, each ring sector 12a can be secured to the two adjacent pellets 7. Where applicable, each ring sector 12a can be manufactured as one part with at least one adjacent superconducting pellet 7. However, as indicated above, a discontinuity 13 must be fashioned in order not to continuously connect all the superconducting pellets 7: where applicable, at least one of the ring sectors 12a then comprises at least one slit 13 in which an insulating layer 14 can optionally be inserted as described above, in order to prevent the formation of current loops.

In this form of embodiment, the superconducting pellets 7 may furthermore have a maximum radius substantially equal to the outer radius of the flux barrier 12 in order to ensure an effective screening of the magnetic field at the radially outer faces of the coils 5 of the armature 2. Note that, in this configuration, the maximum radius of the superconducting pellets 7 is greater than the conventional maximum radius of the superconducting pellets of electric machines of the prior art, such that the radially outer part of the superconducting pellets 7 is part of the flux barrier 12 and at least partially covers the radially outer edge 9 of all the coils 5 of the armature 2.

In a third form of embodiment illustrated in FIGS. 2b and 4a-4c, the flux barrier 12 comprises an assembly of sections 12a together forming a ring which extends over the entire periphery of the part (support structure, superconducting pellets 7, coil of the inductor 3 or coils 5 of the armature 2) of the electric machine 1 to which it as attached. The sections 12a of the crown 12 may have any suitable shape and are uniformly distributed around the axis X of rotation. For example, the sections 12a of the crown 12 can each have a ring sector shape, the height of which is substantially equal to the height of the radially outer edge 9 of the coils 5.

At least one discontinuity 13 is fashioned in the flux barrier 12 to avoid continuously connecting all the sections 12a. For example, at least one of the sections 12a of the crown 12 comprises at least one slit 13 into which an insulating layer 14 as described above can optionally be inserted, to prevent the formation of current loops. In a variant, the sections 12a of the crown 12 can be separated pairwise, possibly with the interposition of an insulating layer 14 between two adjacent sections 12a.

Figure 6:
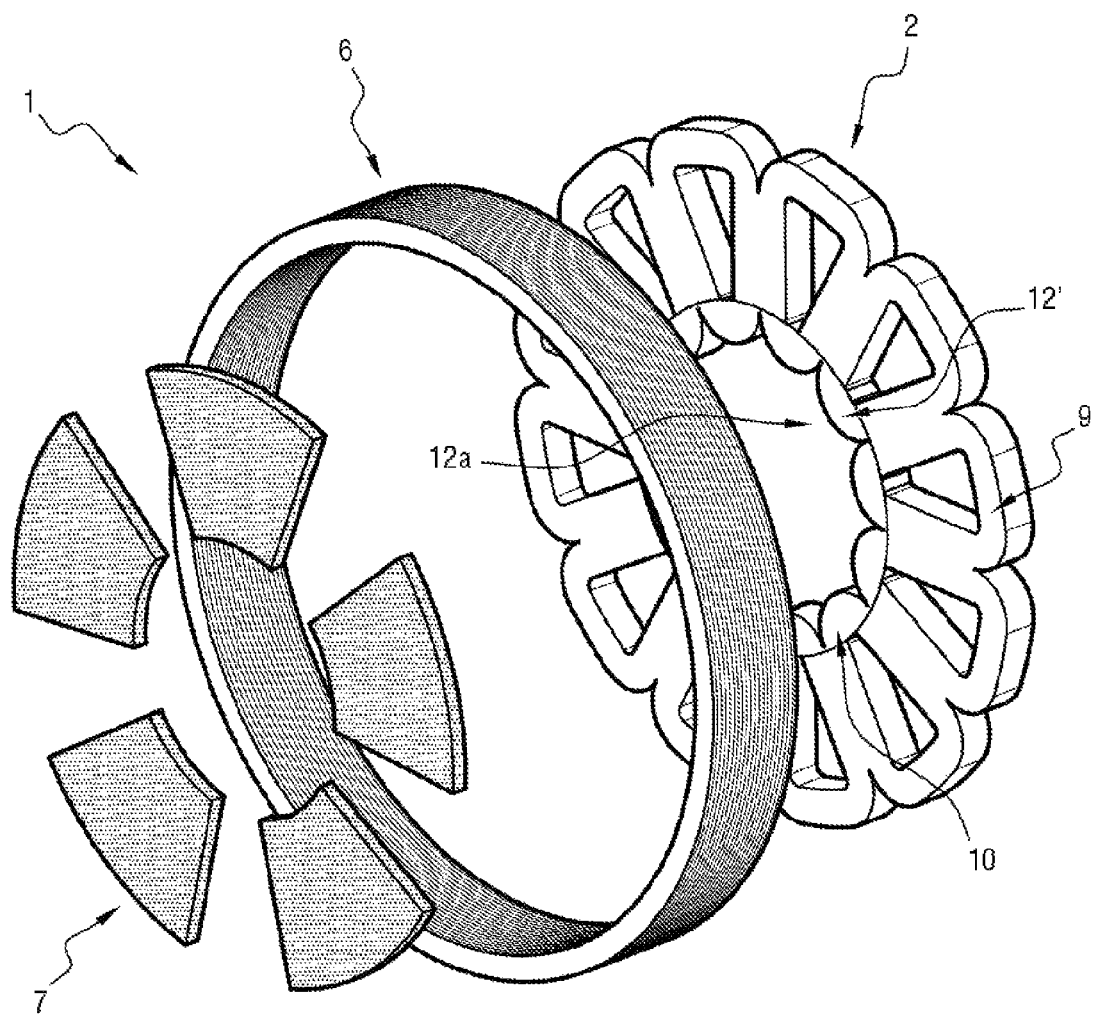
FIG. 6 is a schematic view of an aircraft comprising an electric machine in accordance with the invention.
Figure 7:
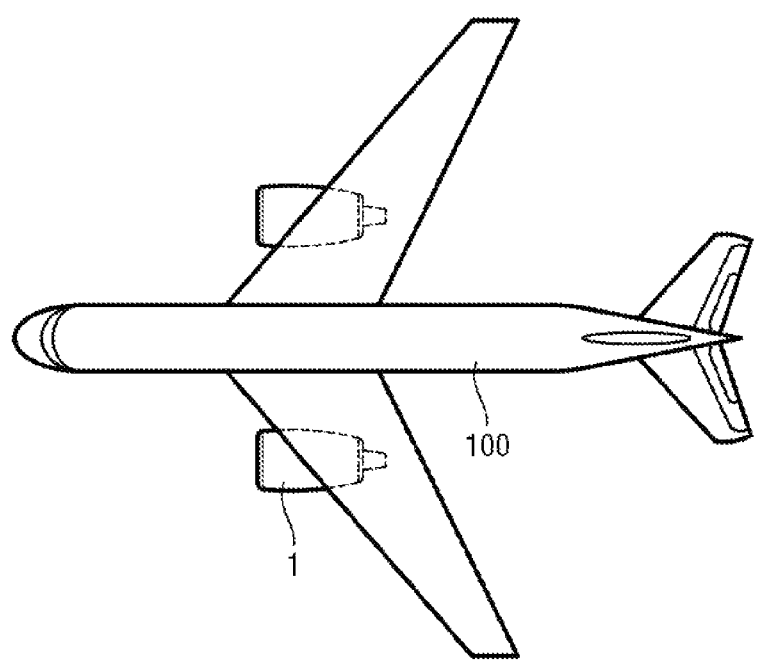
FIG. 7 illustrates an example of an aircraft which can comprise an electric machine in accordance with an embodiment of the invention.

Optionally, in order to further improve the protection of the armature and the power density of the electric machine 1, the electric machine 1 comprises an additional flux barrier 12' extending circumferentially with respect to the axis X, between the superconducting pellets 7 and the armature 2 such as to at least partially cover the radially inner edge 10 of all or part of the coils 5 of the armature 2 (see for example FIG. 6). In other words, the additional flux barrier 12' is positioned such as to mask the radially inner edge 10 of the coils 5. Specifically, the forces at the radially inner edge 10 (or foot) of the coils 5 no longer produce any torque. Owing to the additional flux barrier 12', the magnetic field is then screened at the radially inner edge 10 of the coils 5 and redirected from the armature 2 toward the active regions of the electric machine 1, i.e. radially in the direction of the lateral edges 11 and of the radially outer edge 9 of the coils 5, which makes it possible to increase the power density of the electric machine 1 and protect the radially inner edge 10 from deformations.

The additional flux barrier 12' can have the same configurations (mounted on the armature or on the inductor, on the rotor part or the stator part; annular shape (first form of embodiment), in ring sectors (second or third form of embodiment); etc.), the same component materials and the same thickness as the flux barrier 12, except for the fact that it is positioned in front of the radially inner edge 10 of the coils 5 and not in front of the radially outer edge 9. Thus, the additional flux barrier 12' is placed in front of the armature 2 such as to at least partially cover the radially inner edge 10 of all the coils 5 of the armature 2.

The additional flux barrier 12' can have a height substantially equal to the height of the radially inner edge 10 of the coils 5.

Note that an electric machine 1 (with axial or radial flux) may comprise at least one from among the flux barrier 12 at least partially covering the radially outer edge 9 of the coils 5 and the additional flux barrier 12' at least partially covering the radially inner edge 10 of the coils 5.

Moreover, in the case of an axial machine as illustrated in FIG. 6, and contrary to the flux barrier 12 placed at the level of the radially outer edge 9, the additional flux barrier 12' can be continuous over its entire circumference. Specifically, the formation of current loops in the additional flux barrier 12' in this type of electric machine 1 does not have the consequence of screening areas useful for the generation of the torque of the electric machine 1. It should however be noted that the presence of discontinuities in the additional flux barrier 12' does not impede its operation.

Manufacturing Method

The flux barrier 12 (and/or, where applicable, the additional flux barrier 12') can be obtained by growing from seeds or by stacking of tapes.

When the flux barrier 12, 12' is obtained by growing from seeds, the manufacturing method comprises the following steps:
- producing a conventional pellet-type part, in the shape of a disc or rectangle by growing from seeds in the final shape the most similar to the flux barrier 12;
- machining the part thus obtained such as to obtain the final shape of the flux barrier 12 12.

In the case of a flux barrier 12, 12' of annular strip type (FIG. 3), the part obtained by growing from a seed preferably has the shape of a disc and the machining step consists in producing a through central orifice in the disc such as to obtain the strip.

In the case of a flux barrier 12, 12' of crown type comprising a plurality of contiguous sectors, the part obtained by growing from seeds can also have the shape of a disc and the machining step consists in producing a through central hole in the disc and in forming the different sections of the crown.

In the case of a flux barrier 12, 12' comprising several separate ring sectors, the part obtained by growing from a seed can have the shape of a disk or a rectangle and the machining step consists in producing the coaxial circle portions and the two straight line segments that connect them to obtain the ring sector.

When the flux barrier 12, 12' is obtained by stacking of tapes, the manufacturing method comprises the following steps:
- precutting the tapes into the shape (annular strip, crown, ring sectors) of the flux barrier 12, 12';
- conventionally stacking the tapes thus precut to obtain the flux barrier 12, 12'; and
- optionally, machining the superconducting pellet 7 thus obtained.
- optionally, when the flux barrier 12 is continuous over its circumference, machining one or more slits 13 and, where applicable, inserting an insulating layer 14 as described above.

Where applicable, when the flux barrier 12 is attached to the superconducting pellets 7, the flux barrier 12 and the superconducting pellets 7 can be entirely formed as a single part. In other words, the flux barrier 12 and the superconducting pellets 7 can be manufactured simultaneously by growing from seeds or by stacking of tapes. The thickness of the flux barrier 12 is then equal to the thickness of the superconducting pellets 7 (generally, in the order of ten to twenty millimeters).

Note that, when the flux barrier 12 is attached to the stator, the flux barrier 12 is preferably made by stacking of tapes in order to be able to obtain thicknesses of less than one millimeter.

Application to Radial Flux Electric Machines

In the case of a radial flux electric machine (see for example FIGS. 4b, 4c and 5b), the inductor 3 includes a front superconducting coil 6 and a rear superconducting coil 6' which are annular and coaxial with the axis of rotation X and superconducting pellets 7 mounted on a bearing structure 8 which are disposed circumferentially to the axis X. The armature 2 meanwhile comprises an arrangement of coils 5 disposed circumferentially with respect to the axis X, radially outward of the superconducting pellets 7.

The coils 5 of the armature 2 can each have a substantially rectangular shape, a longer side of which extends parallel to the axis X of the rotor. The coils 5 are assembled edge to edge along their longest side such as to define a substantially cylindrical assembly around the axis X of rotation.

Figure 4B:
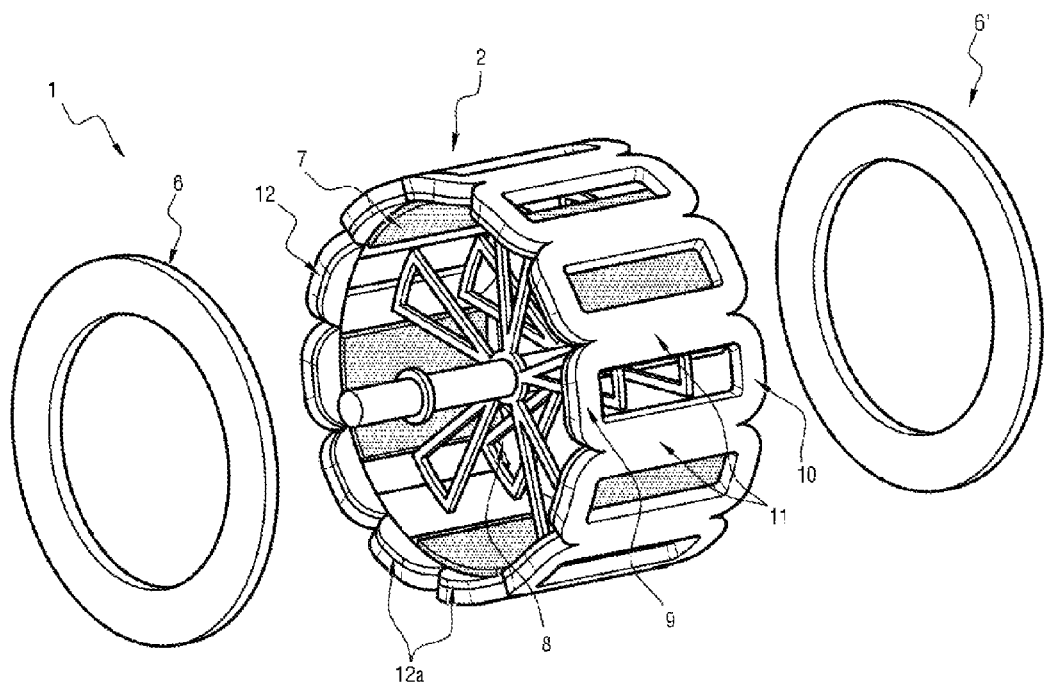
FIG. 4b is a simplified, exploded and perspective view of a radial flux electric machine in accordance with a third embodiment of the invention, wherein the flux barrier is attached to the inductor coils.
Figure 4C:
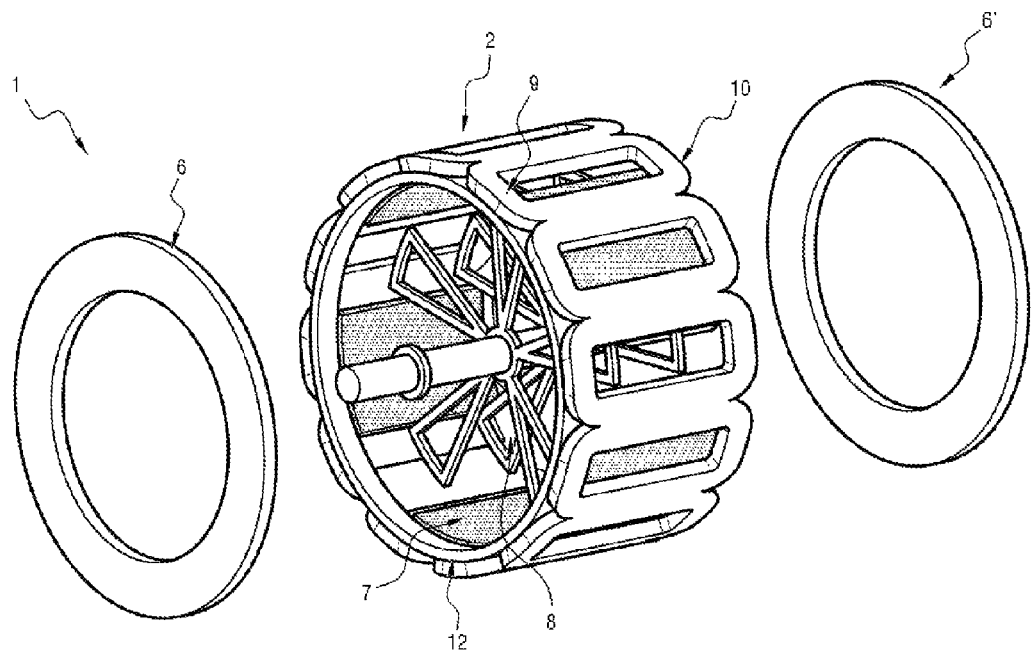
FIG. 4c is a variant embodiment of the radial flux electric machine of FIG. 4b.

The invention described hereinabove is applicable mutatis mutandis to the coils 5 of the armature 2 of a radial flux electric machine 1. The radially outer edge 9 of the coils 5 then corresponds to the edge of the coils 5 (short side of the rectangle) which is adjacent to the front superconducting coil 6 while the radially inner edge 10 corresponds to the edge of the coils 5 which is opposite the radially outer edge 9 and which is adjacent to the rear superconducting coil 6'. The lateral edges 11 meanwhile correspond to the long sides of the rectangle. In particular, the flux barrier or barriers 12, 12' can be placed radially inward of the armature 2 such as to at least partially cover the radially outer 9 and/or radially inner 10 edge of all the coils 5 of the armature 2. The electric machine 1 can therefore comprise a flux barrier 12 at the radially outer edges 9 of the coils 5 and/or a flux barrier 12' at the radially inner edges 10. Moreover, the flux barrier or barriers 12, 12' can be attached to the armature 2 or to the inductor 3, i.e. mounted radially inward of the coil or coils 6, 6' of the inductor 3 (FIG. 5b), on the coils 5 of the armature 2 or on the superconducting pellets 7, as illustrated in FIGS. 4b and 4c. The flux barriers 12, 12' can furthermore have any of the shapes described above and comprise at least one discontinuity 13 to avoid the flux barrier 12 from screening the magnetic field inside the superconducting pellets 7.

The electric machine 1 can in particular be used in an aircraft 100.

The invention claimed is:

1. A superconducting electric machine comprising:
   an inductor comprising superconducting pellets circumferentially distributed around an axis of the electric machine;
   an armature comprising coils, each of the coils having a radially inner edge and a radially outer edge, the radially inner edge and the radially outer edge extending along a circumferential direction with respect to the axis;

a flux barrier extending circumferentially with respect to the axis, the flux barrier extending between the superconducting pellets and the armature such as to at least partially cover at least one among the radially outer edge and the radially inner edge of all or part of the coils of the armature.

2. The electric machine of claim 1, wherein the flux barrier at least partially covers at least one of the radially outer edge and the radially inner edge of all the coils of the armature.

3. The electric machine of claim 1, wherein the flux barrier covers the entire radially outer edge and/or the entire radially inner edge of all or part of the coils of the armature.

4. The electric machine of claim 1, wherein each of the coils further has lateral edges connecting the radially inner edge and the radially outer edge, the flux barrier covering at most 10% of the lateral edges.

5. The electric machine of claim 1, wherein the flux barrier is discontinuous and comprises a slit extending along a substantially radial direction with respect to the axis.

6. The electric machine of claim 5, further comprising an insulating layer housed in the slit.

7. The electric machine of claim 1, wherein the flux barrier at least partially covers the radially inner edge, wherein, when the electric machine is an axial flux electric machine, the flux barrier is able to be continuous over its entire circumference.

8. The electric machine of claim 1, wherein the flux barrier has an annular shape.

9. The electric machine of claim 1, wherein the flux barrier comprises a series of ring sectors, each of the ring sectors extending between two of the superconducting pellets.

10. The electric machine of claim 1, wherein the flux barrier is attached to the armature or to the inductor.

11. The electric machine as claimed in of claim 10, wherein the flux barrier is secured to the superconducting pellets.

12. The electric machine as claimed in of claim 10, wherein the inductor further comprises a coil coaxial with the axis extending radially around the superconducting pellets, the flux barrier being attached to a radially inner face of the coil of the inductor.

13. The electric machine of claim 1, wherein an outer radius of the flux barrier is greater than or equal to an outer radius of the superconducting pellets.

14. The electric machine of claim 1, comprising a flux barrier at least partially covering the radially outer edge of all or part of the coils of the armature and an additional flux barrier extending circumferentially with respect to the axis the additional flux barrier extending between the superconducting pellets and the armature such as to at least partially cover the radially inner edge of all or part of the coils of the armature.

15. An aircraft comprising the electric machine of claim 1.

* * * * *